(12) United States Patent
Forman

(10) Patent No.: US 8,021,163 B2
(45) Date of Patent: Sep. 20, 2011

(54) SKILL-SET IDENTIFICATION

(75) Inventor: George Henry Forman, Port Orchard, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1296 days.

(21) Appl. No.: 11/555,001

(22) Filed: Oct. 31, 2006

(65) Prior Publication Data
US 2008/0124686 A1 May 29, 2008

(51) Int. Cl.
*G09B 3/00* (2006.01)
*G06F 7/00* (2006.01)

(52) U.S. Cl. ........ 434/322; 434/219; 434/350; 434/362; 707/606; 707/602

(58) Field of Classification Search .................. 434/219, 434/350, 322, 362; 705/8, 11, 1.1, 7.38; 707/100, 102, 600, 602
See application file for complete search history.

(56) References Cited

U.S. PATENT DOCUMENTS

| | | | | |
|---|---|---|---|---|
| 6,049,776 A | * | 4/2000 | Donnelly et al. | 705/8 |
| 6,157,808 A | * | 12/2000 | Hollingsworth | 434/350 |
| 6,524,109 B1 | * | 2/2003 | Lacy et al. | 434/219 |
| 6,604,114 B1 | * | 8/2003 | Toong et al. | 707/104.1 |
| 6,804,662 B1 | * | 10/2004 | Annau et al. | 707/2 |
| 6,829,615 B2 | * | 12/2004 | Schirmer et al. | 707/102 |
| 7,260,355 B2 | * | 8/2007 | L'Allier et al. | 434/362 |
| 7,613,708 B2 | * | 11/2009 | Rieffanaugh, Jr. | 707/100 |
| 2002/0169737 A1 | * | 11/2002 | Armstrong et al. | 706/59 |
| 2004/0197759 A1 | * | 10/2004 | Olson | 434/322 |

FOREIGN PATENT DOCUMENTS

WO    WO 00/26839    * 11/2000

OTHER PUBLICATIONS

"Knetmap Products"; Web site printout from http://www.knetmap.com/product.html; Dec. 18, 2006.

* cited by examiner

*Primary Examiner* — Xuan Thai
*Assistant Examiner* — Kang Hu

(57) ABSTRACT

Provided are, inter alia, systems, methods and techniques for facilitating identification of a skilled resource's skill set. Initially, a master set of previously identified skills is filtered in order to identify a subset of skills that appear to be potentially applicable to a skilled resource. Then, based on the identified subset, a query regarding skills actually possessed by the skilled resource is created and presented. A response that designates skills possessed by the skilled resource is received and incorporated into a user skills database. The above-referenced filtering is performed by utilizing an automated tool to analyze content from a set of computer files.

14 Claims, 3 Drawing Sheets

SKILL-SET IDENTIFICATION

FIELD OF THE INVENTION

The present invention pertains to systems, methods and techniques for identifying the skill set possessed by an individual worker or a group of workers.

BACKGROUND

On a regular basis, large service-oriented enterprises typically need to identify employees having particular skills in order to staff immediate projects, as well as to identify overall skill sets (e.g., workforce capacity and skills gaps) for long-range planning purposes. To facilitate this, such companies often have a database that keeps track of the skills inventory of their employees. However, the population and maintenance of such a database usually are quite difficult.

Such conventional systems often require the workers to register their skills into such a database and to keep their information current within the database. However, such a process tends to be extremely time-consuming, particularly when the number of skills being tracked is large and when the naming conventions are highly structured, which often is desirable to facilitate subsequent searches. Moreover, even if an attempt is made at initial registration, employees often neglect to update their records on a regular basis, partly because it is difficult to enumerate all one's skills with respect to a large database of potentially relevant skills in a controlled naming scheme.

DESCRIPTION OF THE PREFERRED EMBODIMENT(S)

Figure 1:
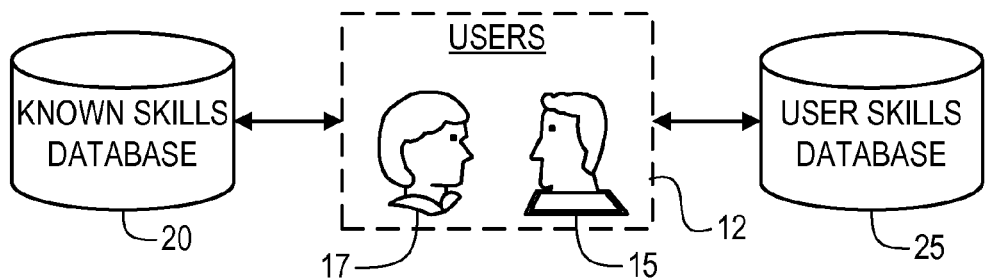
FIG. 1 is a block diagram illustrating certain conceptual interactions within a system for identifying skill sets according to a representative embodiment of the present invention.

FIG. 1 is a block diagram illustrating certain conceptual interactions within a system for identifying skill sets according to a representative embodiment of the present invention. Generally speaking, the main beneficiaries of the system 10 will be the users 12, which can include skilled employees or other skilled workers 15 and managers 17, with any particular individual sometimes acting in the role of a skilled worker 15 and other times acting in the role of a manager 17.

Although FIG. 1 depicts an individual worker 15, reference number 15 generally can represent any skilled resource, e.g., an individual or a group, and all references herein to reference number 15 are intended to apply to either. Also, any mention of users 12 interacting with any aspect of the system according to the present invention is intended to include both personal interaction and/or interaction through automated (e.g., software) agents.

In the preferred embodiments, two main databases are utilized, a known skills database 20 (sometimes referred to as the "master skill set") and a user skills database 25. As illustrated in FIG. 1 and discussed in more detail below, the users 12 have the ability to interact both through direct user interfaces and/or indirectly with databases 20 and 25.

The known skills database 20 preferably includes a list of skills and corresponding skill definitions. The user skills database 25 preferably identifies the particular skills possessed by each of a number of different skilled resources. As indicated above, a skilled resource can refer, e.g., to either an individual skilled worker 15 or to a group of workers that are affiliated in some manner, e.g., a group, department or division within a company.

Figure 2:
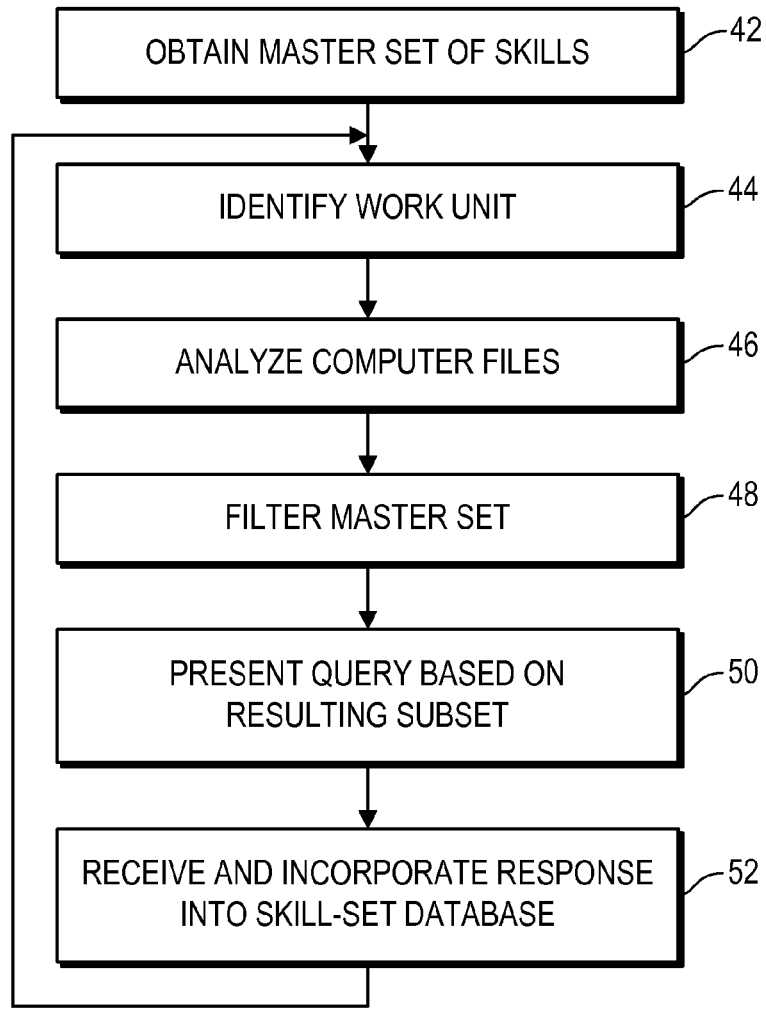
FIG. 2 is a flow diagram illustrating a process for maintaining a user skills database according to a representative embodiment of the present invention.

FIG. 2 is a flow diagram illustrating a process for maintaining a user skills database according to a representative embodiment of the present invention. In the preferred embodiments, the process illustrated in FIG. 2 is implemented entirely in software. However, any or all of such steps instead can be implemented in any of the other ways discussed herein.

Initially, in step 42 a master set of skills, such as database 20, is obtained. Techniques for generating database 20 are discussed below.

Next, in step 44 a particular skilled resource is identified for processing. The identified skilled resource can correspond, e.g., to an employee 15 whose skill set needs to be incorporated into the database 25, or to a previously registered worker 15 or a group of workers 15 whose information in database 25 needs to be updated.

In step 46, a set of computer files is analyzed (preferably, recursively) for any evidence indicating that the identified skilled resource 15 possesses individual skills within master skill database 20. A block diagram of a system 10 according to the present invention is shown in FIG. 3 and illustrates interrelationships between various components and participants.

Figure 3:
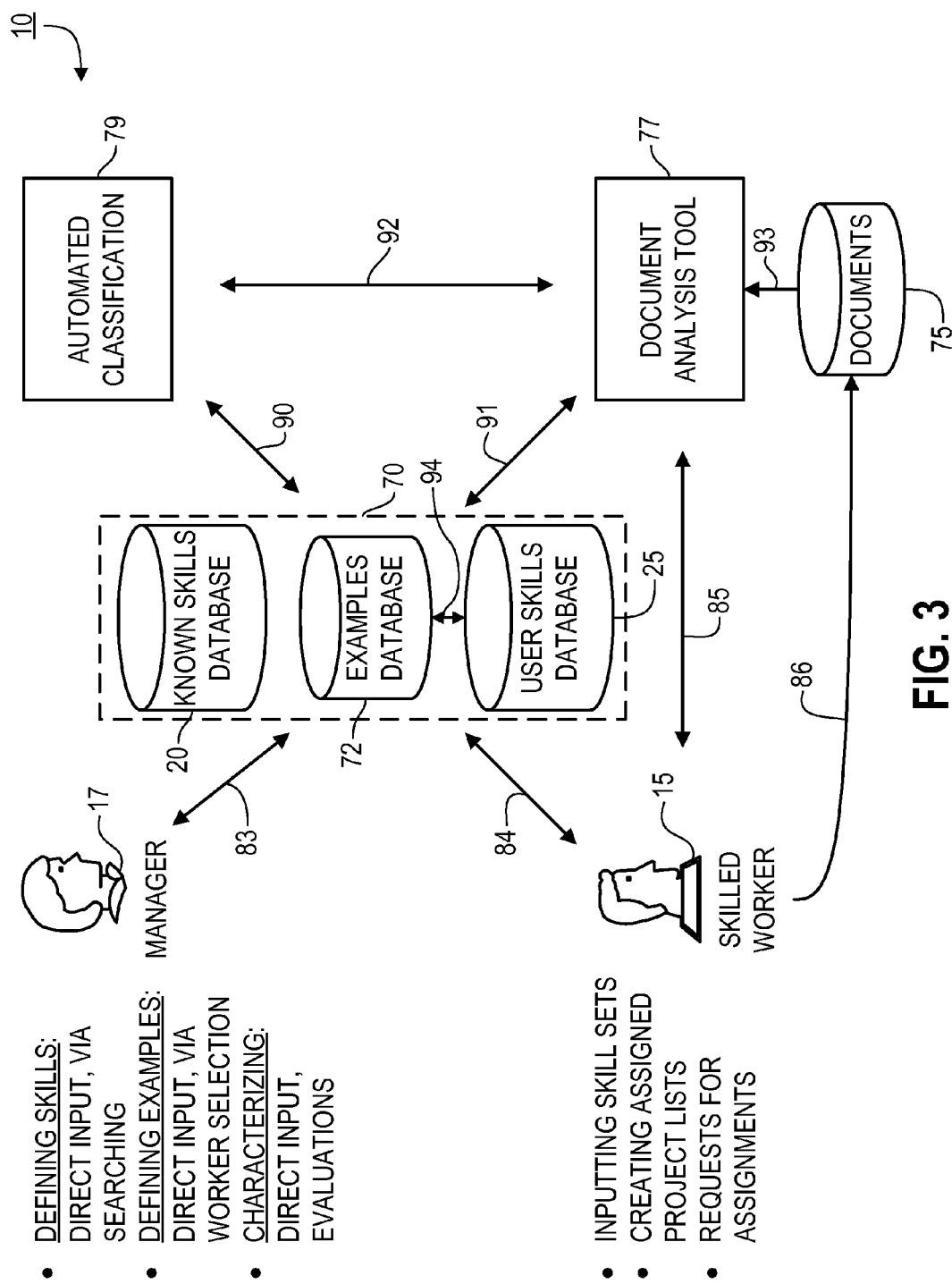
FIG. 3 is a block diagram illustrating an overall system for updating a user skills database according to a representative embodiment of the present invention.

As indicated in FIG. 3, the skilled worker 15 contributes documents to documents database 75, typically by creating new documents and modifying existing documents. Thus, documents database 75 usually will contain documents that have been created by the skilled worker 15, some of which having been subsequently modified by others (either with or without modifications by the skilled worker 15), and others of which having only been worked on by skilled worker 15.

In addition, although not shown in FIG. 3, the documents database 75 often will contain documents that have been created by others, some of which never having been touched by skilled worker 15 and others of which subsequently having been modified by skilled worker 15 (either alone or with contributions from others). Certain techniques for handling all of these various situations are discussed below.

In the typical embodiments, the files to be analyzed in database 75 are stored within a directory structure that has been created and maintained pursuant to day-to-day activities of various users creating and modifying files. In this regard, different embodiments use, e.g., the native directory structure in Microsoft Windows™ and/or a more flexible program, such as an RCS, CSV, or Subversion repository or a document management programs such as Worldox™.

Preferably, the file analysis is performed using an automated (e.g., software) tool 77 which scans the content and/or metadata of the files under consideration. While the entire database 75 is analyzed in some embodiments, in others the database 75 is first pared down to a set of files that are likely to be relevant. For example, with respect to a particular skilled worker 15, the set of files might be limited to only those files having some minimum connection to such skilled worker 15, e.g., only those files that have been created, modified or received (e.g., as an e-mail attachment) by such skilled worker 15.

Once the set of files to be analyzed has been designated, the individual files preferably are analyzed with respect to the individual skills within a known skills database 20. In representative embodiments, this is performed by calculating a score for each file with respect to each of a plurality of the individual skills within database 20. In order to determine this overall score, the preferred embodiments consider: a "matching" score which indicates the document's relevance to the subject skill, an "association" score which indicates whether and the extent to which the subject skilled resource was authored by the worker 15 or the worker 15 is otherwise associated with the document, and an "age" score which indicates how old the document is. Depending upon the particular embodiment, these various component scores either are expressly calculated as separate scores and then subsequently combined, or are implicitly calculated or otherwise considered within the overall score calculation. While there are a number of potential variations in the specific technique used, the implementation of this step 46 preferably takes into account a number of different factors.

First, for purposes of calculating the matching score, each of at least a plurality of the skills listed in master database 20 preferably have corresponding definitions, specifying criteria for concluding that a file is relevant to a particular skill. Such definitions can include, e.g., a list of keywords (such as names of standard code modules or entire library packages pertaining to certain computer skills), document structural characteristics, minimum frequencies of occurrence for particular words or other items, or more complicated criteria such as might be generated by a machine-learning tool. As discussed in more detail below, machine-learning classification is used in certain embodiments of the invention. In any event, in the preferred embodiments, the definitions are stated as a specific formula for calculating a matching score.

A variety of different skill evidence detectors preferably are used in connection with the score calculation, e.g., including one or more of the following:

Detecting the presence of files with specific file types, commonly by their filename suffixes. For example, if C++ source code files are present, recognized as filenames ending with .cpp or .c++, certain embodiments infer that the worker 15 apparently has some skill in programming C++. Such a basic inference also can be applied for other types of files, e.g. Java program files (.java), FoxPro database files (.dbc), CORBA interface definition language files (.idl), etc. It is noted that some embodiments do not even look at the contents of the files (as discussed in more detail below). In other embodiments, as discussed elsewhere herein, the detection of particular file types triggers different processing of the files' contents. For example, an ANT build script file type is recognized by its filename suffix (.xml) and by a "<project>" entity declaration at the top of the file.

Using a language recognizer (e.g., a conventional language recognizer) to detect which natural language (e.g., English, German or Spanish) is present in the contents of files. This would be used to detect skills with foreign languages, as needed by the company.

Using file-type-specific and/or element-specific detectors to identify particular items (e.g., which specific software modules are used/imported from within a subject source code file). Rather than just knowing that the skilled worker 15 is familiar with Perl, using such a detector the system 10 could determine, e.g., that the skilled worker 15 frequently uses (and therefore is proficient with) the ODBC database module for Perl. Likewise, by analyzing the "import" statements in Java source code, the document analysis tool 77 can determine the software packages the author uses, e.g. "org.apache.lucene.index.IndexReader" (Lucene being a known text search engine).

Searching for particular product names or classes of product names within the computer files. In such a case, e.g., frequent references to particular product names can be taken as an indication that the skilled worker 15 has familiarity with such products. Product names generally can be gathered from existing company databases.

Searching computer files for particular words, phrases or other textual tags associated with a field of expertise. For example, if many occurrences are found of words such as "capacitor," "resistor," "diode," and "transistor," the analysis tool 77 infers that the skilled resource 15 has familiarity with electrical engineering or, more specifically, with analog circuit design. The relevant words associated with each skill preferably are included within the definition for such skill in the known skills database 20. Such words are assigned manually and/or selected automatically, e.g., by automated classification module 79 processing documents associated with examples for such skill that are indicated in examples database 72.

As noted elsewhere herein, through the use of examples a machine-learning classifier can be trained and used to recognize a particular skill.

Different considerations preferably influence the association score. For example, for each file a determination preferably is made as to whether the subject skilled resource has authored, or otherwise contributed to or has some association with, the file. It is noted that uncertainty can occur, e.g., where the files are stored on a central server and can be accessed by a number of different workers 15, or simply where a worker 15 acquired a file and simply saved it without modification.

In some embodiments, the association score is based on the metadata associated with the files (e.g., file authorship or ownership attributes). In preferred embodiments, the association score also (or instead) is based on data within the file (e.g., an individual's name, identifier, alias or other identification information within a software source code or other type of file or similar identification information related to the file as metadata). Preferably, the criteria for use in calculating the association score are different depending upon the type of file. For example, it would be more unusual to see an individual's name within a software source code file if that person were not at least one of the authors than it would be to see the person's name within a Microsoft Word™ document.

If a determination is made that the worker 15 is an author of the current file, then in certain embodiments the extent of authorship or involvement is determined. In representative embodiments of the invention, this determination is expressed as a value within the closed interval [0, 1], with 0 indicating no authorship and 1 indicating sole authorship, and is made based on a number of different kinds of observed data. First, if there are a large number of apparent authors, then the contributions of each individual author preferably is assumed to be lessened. Second, the relative appearance of the author's names or other identifiers (or aliases) in certain embodiments is used to provide some indication of the relative contributions. However, it is noted that such differences instead might be caused, e.g., in a software source code file, by different individual propensities for inserting comments or for attaching one's name to such comments. Accordingly, prior knowledge concerning the individuals' habits in this regard preferably is incorporated into the model.

It is further noted that metadata associated with a file often will be able to provide a better indication of the relative contributions of the different authors. For example, to the extent such metadata exist, the automated analysis tool 77 preferably considers the total amount of time spent by an individual editing the file, the number of different days on which the file was edited by the individual, the number of times the file was edited by the individual, and/or the number of different versions of the files saved by the individual, in the course of determining the association score for a particular computer file with respect to a particular skill.

Of course, the mere saving of a file does not necessarily mean that the individual actually made any (or any significant) changes, so amount of editing time generally will be a better indication of contribution. Also, where multiple different versions are present and it appears that an individual actually created at least one of them, in certain embodiments a comparison is made against a prior version using a commercially available comparison program and then the quantity of changes made is determined and used to influence the document's association score.

In the embodiments described above, a value selected from a range (e.g., [0, 1]) is used to express the extent of authorship once a binary decision regarding authorship has been made. In alternate embodiments, the decision regarding authorship itself is expressed as a value within a specified range, e.g., as a probability of authorship, and/or both the decision regarding authorship and extent of authorship are combined into the expression of a single value within a specified range. In either event, the association score preferably is based on such authorship value(s).

One example of an authorship or association score is the apparent percentage contribution of the subject skilled resource to use the creation of the computer file (e.g., based on percentage of editing time and/or percentage of content inserted, to the extent the foregoing can be determined).

Even if the skilled resource 15 is determined not to be an author, the mere association of the file with the skilled resource generally will have some significance. For example, receiving a large number of e-mails, letters or memoranda regarding a particular topic typically will tend indicate that the person has some knowledge of the content (or at least of the people who have a more thorough knowledge of such content). However, a mere recipient preferably is not presumed to have as much detailed firsthand knowledge as another person who actually is an author. Similarly, the author of a reference that is cited in an article, where the article itself is a computer file being analyzed, generally can be assumed to have at least some knowledge pertaining to the content of the article. Accordingly, some lesser number of association points preferably is assigned to a document for which the identified skilled resource is not an author, depending upon the particular status identified (e.g., a higher number for an actual recipient and a lower number for a person who simply is mentioned but does not appear to be a recipient or the author of a reference). Alternatively, if the skilled resource 15 is determined not to be an author, in other embodiments the ownership score is set to 0 (effectively making the association score an "authorship" score).

Irrespective of association, the analysis tool preferably also considers the dates associated with the documents, e.g., for the purpose of reflecting whether the corresponding skills appear to be current or appear not to have been used in some time, meaning that they might have become out-of-date or forgotten to some extent. In the preferred embodiments, for purposes of calculating or otherwise determining such an age score the analysis tool 77 considers the document creation date and/or the last document modification date, or the last date on which the document appears to have been modified by the subject skilled worker 15. The age score preferably declines with increasing age, e.g., in a linear or an exponentially decaying manner.

In certain embodiments of the invention, in addition to (or instead of) determining an age score, the document analysis tool 77 logs information regarding the age of the documents. Later, that information can be used, e.g., by manager 17 as a search parameter when attempting to identify an appropriate skilled resource 15.

Upon substantial completion of the computer-file processing, analysis tool 77 has for each file a matching score, an association score and an age score, although in alternate embodiments the various considerations already will have been combined into a single overall or composite score. If not, then the matching score preferably is modified by the association score and the age score, e.g., by simply multiplying all three together, so that lower association and age scores lower the overall score. In alternate embodiments, more complicated linear or nonlinear combinations are employed.

In any event, the result is an individual score for the current document with respect to a particular skill within master skill database 20. The individual document scores preferably are then combined to provide a single score for such skill relative to the subject skilled resource. In certain embodiments, simple addition of the individual document scores is used. In others, a nonlinear combination is used. In still further embodiments, the overall score for a particular skill is based on the individual component scores for the various documents, e.g., by taking into consideration the profile of relevant document association (e.g., contribution levels) over time.

As indicated above, metadata regarding a file often will be the best indication of an individual's true contribution to, or familiarity with, the file. Software systems that generate a significant amount of such metadata, particularly of the types mentioned above, are therefore preferred. In addition, in exemplary embodiments tracking or monitoring software is used in order to generate additional metadata. Straightforward extensions of tracking or monitoring software (e.g., software used for an employer to monitor the amount of time spent on different tasks by its employees) can produce useful information regarding how an individual initially obtained a file (e.g., created it, downloaded it or received it as an e-mail attachment) and how much time he or she subsequently spent working on it.

Returning to FIG. 2, in step 48 the master set of skills (e.g., database 20) is filtered in order to identify a subset of the skills that appear to be potentially applicable to the current skilled resource 15. In the preferred embodiments, this step is performed simply by using a fixed threshold (e.g., predetermined) and identifying only those skills having an associated score that is higher than the threshold. However, in alternate embodiments a flexible threshold is used, e.g., by sorting the scores and selecting all skills that meet some specified criterion, such as a specified percentage of the overall skill scores being above a specified threshold.

In addition, as discussed in more detail below, the skills preferably are arranged within database 20 in a hierarchical manner. Accordingly, in certain embodiments lower-level skills are omitted from the subset in favor of a higher-level skill if all (or a specified portion) of the lower-level skills making up the higher-level skill have been preliminarily identified in this step 48.

Next, in step 50 a query is presented to the skilled resource (e.g., a particular skilled worker 15 or a group of such workers 15) based on the subset identified in step 48. Preferably, this query asks the skilled resource 15 to confirm that he, she or it actually possesses the skills identified in step 48. In the simplest case, the entire subset is presented in the skilled resource is asked to identify any that should be deleted.

In alternate embodiments, each skill is presented with a strength indication, and the skilled resource 15 is asked to make any modifications that are appropriate. For example, in one embodiment each skill is presented together with radio buttons corresponding to four or five strength categories, from no experience to expert, with one of the radio buttons pre-selected based on the overall score calculated for the skill in step 46. The skilled resource 15 (or its representative) either leaves the default unchanged or clicks on a different radio button corresponding to a different strength level.

In still further embodiments, the hierarchical structure of the skill database 20 is exploited. For example, in one embodiment the highest-level skills identified in step 48 are presented with the lower-level skills beneath them. The skilled resource 15 then has the option of either modifying the highest-level skill (thereby saving a significant amount of time) or drilling down into the lower-level skills beneath it (if more granular adjustments are believed desirable). In either such case, the decision again can be binary or multi-level, depending upon the particular embodiment.

It is noted that in certain embodiments, this step 50 is performed automatically to query the applicable skilled resource 15 upon completion of step 48. In alternate embodiments, it is invoked by the skilled resource 15 when desired in order to assist him, her or it in completing its skill-set records.

In either event, in step 52 the response from step 50 is received and incorporated into user skills database 25 (shown in FIGS. 1 and 3). As a result, a new or modified entry is created for the current skilled resource 15.

Thereafter, processing returns to step 44 to identify the next skilled resource and begin processing it. In this regard, the process illustrated in FIG. 2 preferably is implemented for a particular skilled resource whenever there is a substantial change, such as the addition of an employee into the system, and also is implemented on a periodic basis to update database 25. In the latter case, it generally will be desirable to only process (in step 46) any computer files that have been modified or added since the previous processing for the particular skilled resource 15, in which case the raw score data from previous iterations preferably are retained for use in updating subsequent iterations.

The foregoing discussion focused primarily on the updating of the user skills database 25. The present discussion focuses on the generation and maintenance of master skill database 20 and primarily refers to FIGS. 3 and 4, the latter emphasizing certain components and sub-components of the elements shown for the overall system 10, which is illustrated in FIG. 3. Initially, a couple of concepts underlying system 10 are described.

One aspect of a system 10 according to preferred embodiments of the invention is the variety of different ways in which the users 15 and 17 can interact with the system 10. In this regard, each of reference numbers 83-86 shown in FIG. 3 corresponds to one or more user interfaces that allow the corresponding user 15 or 17 to input information into and/or extract information from system 10, as indicated. Additional interfaces 91-94 are provided between different components of the system 10, thereby permitting internal communications.

Figure 4:
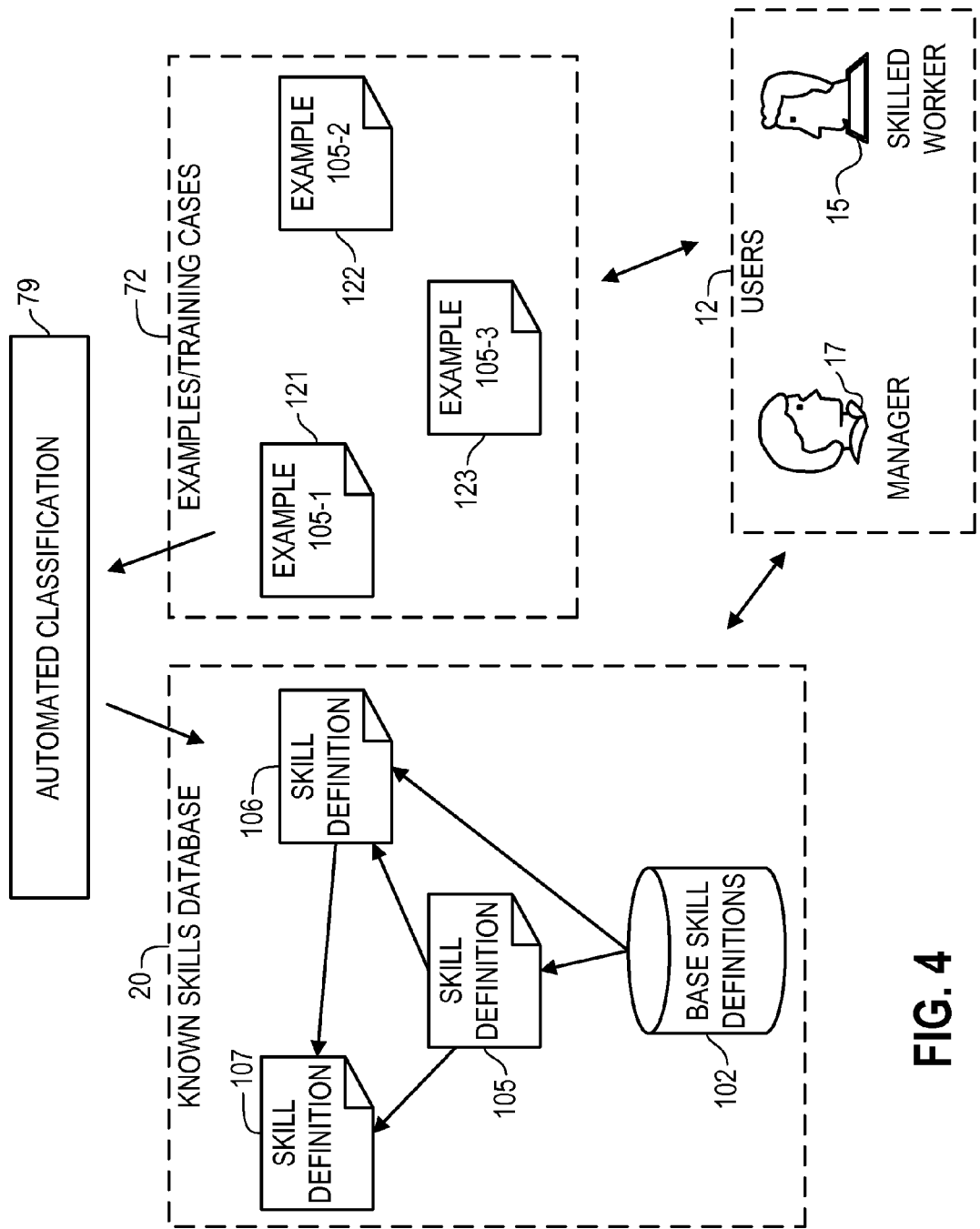
FIG. 4 is a block diagram illustrating the updating of a known skills database according to a representative embodiment of the present invention.

Referring to FIG. 4, it can be seen that known skills database 20 preferably is implemented as a hierarchical arrangement of various skills, with a set of base skills 102 and a number of higher-level skills 105-107, the latter being characterized by the fact that they are defined by reference to lower-level skills. Thus, skill 105 is defined only by reference to a combination of lower-level skills in the base set 102, while skill 106 is defined by reference to skills in the base set 102 and by reference to at least one higher-level skill 105, and skill 107 is only defined by reference to other higher-level skills 105 and 106. For example, a particular higher-level skill 107 might be defined as a minimum experience level of 2 in lower-level skill 105 and a minimum experience level of 4 in lower-level skill 106. As discussed above, the definitions for base skills 102 include, e.g., any combination of: existence or frequency of occurrence of particular keywords, specified document structure, specified document types, or the like.

Such a hierarchical approach can allow better skill-such classification up the value chain, thereby providing more efficient allocation of resources. While just a handful of skills are illustrated in FIG. 4, it should be noted that there often will be hundreds or thousands of skills defined in database 20.

Referring to FIGS. 3 and 4, in the preferred embodiments of the invention the overall database 70 of the system 10 preferably includes, in addition to the master skill database 20 in the user skills database 25, an examples database 72. In the particular illustration of FIG. 4, examples database 72 includes three examples 121-123 representing three different skilled resources 15 that have been identified as having skill 105.

The use of examples database 72 generally provides additional flexibility, allowing the users 15 and 17 to provide a greater variety of information that will be useful in connection with the construction and maintenance of known skills database 20. For instance, the specifying of examples 121-123 allows an automated classification module 79 to play a role in defining individual skills within database 20 and defining skill sets for individual skilled resources in database 25. In this regard, classification module 79 preferably is implemented entirely in software (although it instead can be implemented in any other manner described herein) as one or more machine-learning tools.

As noted above, known skills database 20 often will contain a large number of individual skills, and accordingly the present invention preferably implements techniques to facilitate the interaction between the various users 15 and 17, on the one hand, and the known skills database 20, on the other. In this regard, information pertaining to the list of skills and their definitions (in known skills database 20) and information pertaining to the skill sets of individual skilled resources (in user skills database 25) preferably is input from a variety of different sources and in a variety of different ways. Some of these are illustrated in FIG. 3 and discussed as follows.

A manager 17 preferably has the ability to directly input information into system 10. In addition, in the course of his or her daily activities, the manager 17 typically will input a variety of different types of information into different computer programs, e.g., for project scheduling, employee evaluation and reporting to hire-level management. In the preferred embodiments, the system 10 captures at least some of this information and uses it for skill definition and for establishing skill sets for individual employees or other skilled resources 15.

Both types of direct and indirect input can be used by a manager 17 for defining skills in database 20. For example, the manager 17 preferably has the ability to directly create new skills for inclusion into database 20 and then either specifically define the applicable criteria or define any subset thereof. For instance, the manager 17 preferably has the ability to specify a list of characteristics that relate to a particular skill without specifically indicating what weights should be applied to such various characteristics or how they should be used to determine existence of the particular skill. Later, such weights or other implementation details preferably can be input by others or generated automatically by classification module 79, e.g., using input examples 121-123.

As to indirect input, one of the most significant uses that manager 17 will make a system 10 is in searching for particular personnel to assign to projects that require staffing. In the course of doing so, manager 17 preferably has direct access to database 20 (via user interface(s) 83) and is allowed to pick and choose which skills within database 20 are most desirable for particular staffing needs. As a part of this searching process, system 10 preferably prompts the manager 17 to identify any particular elements that would be relevant to the skills identified, e.g., by displaying the current definitions for identified skills and asking if any modifications are appropriate (thereby providing additional definition information). In addition, system 10 preferably prompts the manager 17 to designate whether it is appropriate to group together any of the skills that manager 17 has included within her search request, and thereby define a new, higher-level skill that can be defined as the designated combination of existing skills (thereby providing additional hierarchical information).

In addition, manager 17 preferably has the ability to designate examples 121-123 of individuals or other types of skilled resources 15 that possess a particular skill, both directly and indirectly, in much the same manner as when defining skills (discussed above). In either case, the manager 17, in addition to simply identifying the skilled resource 15 and corresponding skill, preferably also has the ability to designate how capable she believes the skilled resource 15 is with respect to the subject skill (e.g., on a scale of 0-4, by clicking on a radio button corresponding to the appropriate skill level).

Indirect input can occur, e.g., when the manager 17 selects a particular skilled resource 15 to perform a function for which a particular skill was a prerequisite; in such a case, the system 10 either automatically designates the skilled resource 15 as having such skill or first asks the manager 17 to confirm her belief that the skilled resource 15 has the subject skill and, optionally, to rate the capability of the skilled resource 15 with respect to the subject skill. In addition, or instead, the system 10 preferably automatically prompts the manager 17 with a similar query after the project has been underway for a period of time, or upon completion of the project.

Finally, the manager 17 preferably has the ability to characterize the skill set of individual skilled resources with which he is familiar, again both directly and indirectly. Indirect characterization can occur, e.g., when the manager 17 fills out an online employee evaluation form.

In a similar manner, system 10 preferably accepts both direct and indirect inputs from the individual skilled workers or other skilled resources 15. Direct inputting of a skill set by a skilled resource 15 preferably is performed in the manner described above in connection with step 50. Indirect inputting can occur, e.g., where an employee 15 fills out a list of projects to which he is assigned or when he submits an online request to be assigned to a particular project. In either case, the system 10 preferably assumes that the employee 15 is asserting that he has at least the posted minimum skill levels.

The variety of information that is provided into the different databases 20, 25 and 72 preferably is processed by automated classification module 79. For example, conflicting classification and/or skill-set information is resolved in certain embodiments of the invention using a filtering process. Incomplete information preferably is processed using machine-learning techniques. For example, a partial definition of a particular skill in which relevant items are identified but no further information is given preferably is treated as at least a preliminary feature set for training against the examples in database 72, with the resulting classifier functioning as a definition for the subject skill.

In addition, document analysis tool 77 preferably is configured to interact cooperatively with automated classification module 79. For example, while analyzing documents as indicated above, in representative embodiments analysis tool 77 also performs data mining, searching for characteristics that potentially can be used as additional features in the classification feature sets used by classification module 79. In such embodiments, classification module 79 preferably provides analysis tool 77 with information regarding the types of features on which it should focus, and analysis tool 77 provides the identified features to classification module 79.

Still further, document analysis tool 77 preferably is used to identify additional skills that previously were not present in skill database 20. For example, when analyzing software source code files, due to the highly structured nature of such files, it is relatively easy to extract the names of software modules or entire software packages that are being used. Upon identifying a new module or package that is not currently listed as a skill, or after encountering such a new module or package in accordance with a specified minimum threshold, the name of the software module or package preferably is added as a new skill and the corresponding worker or other skilled resource 15 is indicated as having such skill. In certain sub-embodiments, the strength of the skill also is indicated, e.g., using criteria similar or identical to the criteria used for evaluating the strength of skills pertaining to other software packages.

Alternatively, rather than entering the name of the new item as a new skill, in other embodiments the item is logged as additional information. Then, if a manager 17 is unable to find a specific skill in the database 20, she can search such additional information to see if there is any skilled resource 15 that matches her requirements. In such alternate embodiments, the manager 17 has the discretion as to whether to define a new skill to be included within database 20, e.g., after further investigation and discussions with the applicable skilled resource 15. This approach can provide a secondary source of information (e.g., keyword searchable) without unduly expanding the database of skills 20.

One aspect of the preferred embodiments of the invention is the use of skill definitions. In addition to use in identifying computer files that evidence particular skills, in certain embodiments the definitions themselves can be searched by the users 12 in order to help identify the particular skill that the user 12 is interested in referencing. Additionally, or instead, separate descriptive information regarding the skills in database 20 preferably is provided for such searching purposes.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks (e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks); a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

In certain instances, the foregoing description refers to clicking or double-clicking on user-interface buttons, dragging user-interface items, or otherwise entering commands or information via a particular user-interface mechanism and/or in a particular manner. All of such references are intended to be exemplary only, it being understood that the present invention encompasses entry of the corresponding commands or information by a user in any other manner using the same or any other user-interface mechanism. In addition, or instead, such commands or information may be input by an automated (e.g., computer-executed) process.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of facilitating identification of a skilled resource's skill set, comprising:
   (a) filtering, via a processor, a master set of previously defined skills stored in a known skills database in memory, the filtering including comparing computer files that are correlative to skilled resources and are stored in a documents database in memory, to the master set in order to identify a subset of skills that are potentially applicable to a skilled resource;
   (b) creating and presenting, via the processor, a query regarding skills actually possessed by the skilled resource, based on the identified subset;
   (c) receiving, via the processor, a response that designates skills actually possessed by the skilled resource; and
   (d) incorporating, via the processor, the response into a user skills database stored in memory,
   wherein the filtering in step (a) is performed by utilizing an automated tool to analyze the computer files, and wherein the automated tool makes a determination regarding authorship of a particular computer file and assesses competency of the skilled resource with respect to a particular skill based on said determination.

2. A method according to claim 1, wherein the previously defined skills in the master set are arranged in a hierarchical manner.

3. A method according to claim 1, wherein for a particular skill in the master set, the automated tool applies different predefined criteria to different types of the computer files in the documents database, and wherein said different predefined criteria are specific to the particular skill.

4. A method according to claim 1, wherein the query includes a hierarchical arrangement of a plurality of the skills in the identified subset.

5. A method according to claim 1, wherein the automated tool at least one of: (i) takes into consideration, for purposes of determining a skill level, how recently the computer files were modified by the skilled resource; and (ii) logs information regarding how recently the computer files were modified by the skilled resource and uses said information for ranking different skilled resources.

6. A method according to claim 1, wherein said determination regarding authorship is based on whether identification information for the skilled resource is associated with the particular computer file.

7. A method according to claim 1, wherein the automated tool identifies skills by at least one of: (i) detecting the computer file types; (ii) searching for product names within the computer files; (iii) identifying textual tags that have been specifically defined for a particular skill; and searching for customer names within the computer files; (iv) using a natural-language recognizer; and (v) using a machine-learning text classifier that is trained to recognize a particular skill.

8. A method according to claim 1, wherein the automated tool makes a determination regarding metadata of the particular computer file, and assesses competency of the skilled resource with respect to the particular skill based on the determination, and wherein the metadata comprises the authorship and how recently the particular computer file was modified by the skilled resource.

9. A method according to claim 1, wherein the step (b) of creating and presenting a query comprises presenting at least a portion of the identified subset, so that skills in the portion of the presented identified subset can be selected as actual skills possessed by the skilled resource.

10. A non-transitory computer-readable medium storing computer-executable process steps for facilitating identification of a skilled resource's skill set, said process steps comprising steps of:
(a) filtering a master set of previously identified skills in order to identify a subset of skills that appear to be potentially applicable to a skilled resource;
(b) creating and presenting a query regarding skills actually possessed by the skilled resource, based on the identified subset;
(c) receiving a response that designates skills possessed by the skilled resource; and
(d) incorporating the response into a user skills database, wherein the filtering in step (a) is performed by utilizing an automated tool to analyze content from a set of computer files correlative with skilled resources and stored in a documents database, wherein the master set is stored in a known skills database and includes associated definitions for the previously identified skills, and wherein the automated tool makes a determination regarding authorship of a particular computer file and assesses competency of the skilled resource with respect to a particular skill based on said determination.

11. A non-transitory computer-readable medium according to claim 10, wherein the previously identified skills in the master set are arranged in a hierarchical manner.

12. A non-transitory computer-readable medium according to claim 10, wherein the automated tool at least one of: (i) takes into consideration, for purposes of determining a skill level, how recently the computer files were modified by the skilled resource; and (ii) logs information regarding how recently the computer files were modified by the skilled resource and uses said information for ranking different skilled resources.

13. A non-transitory computer-readable medium according to claim 10, wherein the query includes a hierarchical arrangement of a plurality of the skills in the identified subset.

14. A non-transitory computer-readable medium according to claim 10, wherein the query presents at least a portion of the identified subset so that skills in the portion of the identified subset may be selected as skills possessed by the skilled resource.

* * * * *